United States Patent Office 3,289,293
Patented Dec. 6, 1966

3,289,293
PROCEDURE FOR WELDING A JOINT AND PROTECTING THE JOINT AND ADJACENT METAL SURFACES AGAINST RUST AND CORROSION
Knut Torsten Stenquist, Orebro, and Gunnar Walfrid Ringstrom, Goteborg, Sweden, assignors to Torsten Stenquist Ingerjorsfirma, Orebro, Sweden
Filed Feb. 6, 1963, Ser. No. 256,747
2 Claims. (Cl. 29—484)

The present invention relates to a method for efficiently welding a joint and protecting the joint and the metallic surfaces adjacent thereto against rust and corrosion.

In practice, it has proven impractical to weld sheets galvanized or otherwise treated for protection against corrosion, if the zinc layer and/or other agent or material resistant to corrosion comes in touch with the welding torch or heated sheet surfaces. Such a contact will cause blisterings in the surface finish itself and/or in the welding seam. Further, the seam may be filled with extraneous material, e.g. zinc, lead or such things, which will give rise to a weakness of the welded joint. Likewise, in zones between different kinds of materials and/or application of different procedures for surface finishing, it is difficult to provide for surface protection having sufficient adherence and corrosion resistant properties. The basic object of the instant invention is to overcome the above and other disadvantages and to provide for the welding of a joint and the protection of the same and the adjacent metal surfaces in a novel and effective manner.

In the drawing.

Like reference characteristics refer to like elements in the various figures.

Figure 1:
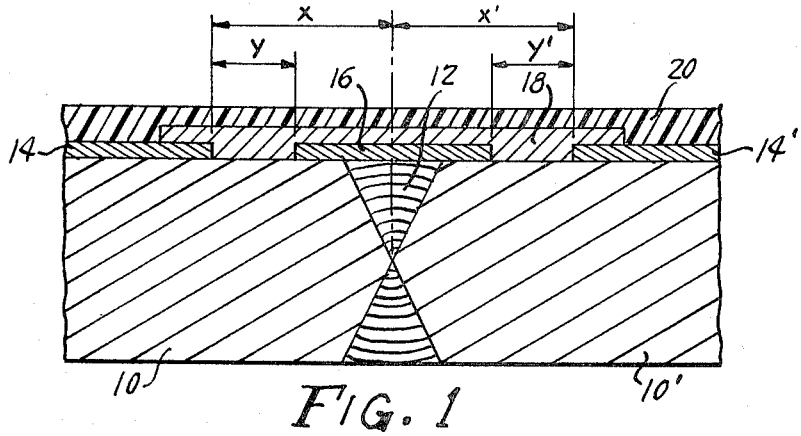
FIGURE 1 is a cross-sectional view through a welding joint showing one form of protective coatings in accordance with the instant invention.
Figure 2:
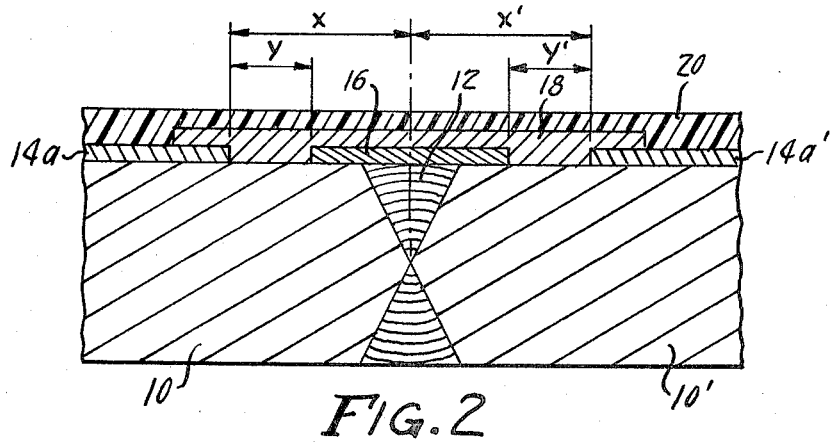
FIGURE 2 is a view similar to FIGURE 1 showing a slightly modified embodiment of this invention.

According to the invention the metallic objects 10 and 10', which are to be welded together by the joint 12 should be carefully cleaned, e.g., by sandblasting and the like to remove all kinds of impurities, such as fouling, rust and rolling skin. The thus-cleaned metal surfaces should be coated as soon as possible with rust and corrosion preventive layers of zinc rich paint 14, 14' by means of spraying, rolling or brush application. The layers 14, 14' should be applied, leaving uncovered areas $x$, $x'$ up to a distance of 5 to 25 centimeters from each of the surfaces intended to be welded. The welding is then performed in the usual manner. Following the welding operation, the welding joint 12 and the uncovered areas $x$, $x'$ are cleaned carefully, for instance by means of vacuum blasting, or the like. Then, as soon as possible the welding joint 12 and limited portions of the uncovered areas $x$, $x'$ are coated with a hot zinc layer 16 by spraying or the like. The layer 16 is applied in such a way that the adjacent layers of zinc rich paint 14, 14' shown in FIGURE 1 or other rust and corrosion protective coatings 14a, 14a' shown in FIGURE 2 will not be damaged or covered, but so that open, free and unprotective zones $y$, $y'$ are left. A subsequent coating 18 with zinc rich paint is then applied to cover the zinc layer 16 and the unprotected and clean zones $y$, $y'$ and to overlap the previous coatings with zinc rich paint 14, 14' or other treatment 14a, 14a'. In this manner a solid fastened bridge between the different underlayers is formed. Further, yet another overall coating layer 20 of a different plastic or paint may be added in order to reinforce further the corrosion resistance of the metallic surfaces.

The zinc rich paint consists of binding agents and zinc pigments, and in the dry film the proportions of zinc can vary between 85 and 96 percent.

The metallizing process of this invention provides a clean metal underlayer, and at the same time irregularities, if any, on the surface of the welding joint form an additional reinforcement of the adherence of the zinc layer resulting in a smooth surface. Moreover, humidity, if any, is kept away from the section subjected to surface treatment for a time sufficient that the subsequent application with zinc rich paint is effected.

The procedure of the instant invention does not permit the metallized layer of zinc to come in contact with or to adhere to prior adjacent coating, which would incur damage and/or a bad adherence along the coatings in the intermediate zones. If this were not done, in spite of subsequent surface treatment with zinc rich paint, such a contact would give rise to an underlying formation of rust, if damages or cracking were hidden in the first coating. According to the procedure of this invention, the provision of an intermediate zone provides the advantage that the edge sections and adjacent surface sections can be inspected before the application with zinc rich paint. The application of the zinc-rich paint according to this invention will, on the one hand reinforce the metallized surface, the uneven structure of which will be filled up, and on the other hand the adherence of the two zinc layers will reinforce each other and the effect of their rust protection will thus be increased. Moreover, the clean intermediate zone will be coated and protected with the zinc rich paint, which creates an electroplate solid anchored surface protection. Finally, the adjacent portion on each side of the 5 to 25 centimeters areas $x$, $x'$ will be reinforced by overlap. The previous treatment can consist of a metallic surface protection or a paint layer resistant to corrosion.

Figure 3:
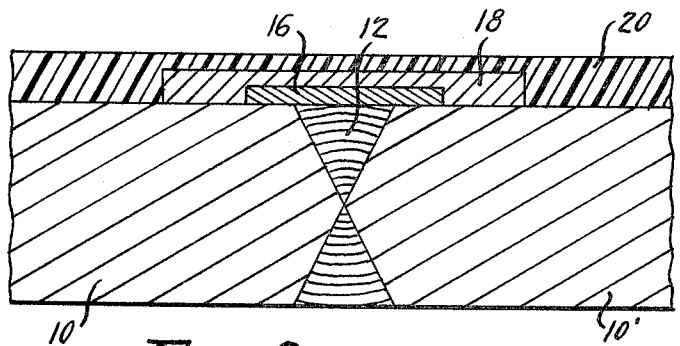
FIGURE 3 is a cross-sectional view showing yet another embodiment of the instant invention.

A further surface treatment following the process of this invention to bring about a coating that provides an excellent corrosion resistence. FIGURE 3 shows a welding joint 12, which has first been coated and the surface treatment has been performed subsequently, such as in welded structures of iron plates, for instance cisterns situated in the ground or in mountain rooms. Generally, they are given a coating of bitumen in the top of a corrosion resistant primer of simple kind. An alternative method, for surface treatment of for instance a cistern proposed to be situated in a mountain room, refers to providing the sheet sections in finish painted condition and then applying, in connection with the welding process, such a surface treatment that has been described above and shown in FIGURES 1 or 2. The procedure first merely protects the welding joint 12, and moreover the 5 to 25 centimeters areas $x$, $x'$ on the two sides thereof. The welding tank is then exposed to tests for leakage by liquid filling or by exposing it to an overpressure. This procedure facilitates inspecting the joint 12 for leakage by the obviously marked welding joints, which are clean and of a light grey colour tone deriving from the zinc rich paint, changes being clearly indicated in the colour, if any leakage is present in the welding joint.

The method of this invention has the advantage, besides that of giving a protection up to 100 percent, of enabling execution in one order and independent of the weather conditions. By means of the added application of zinc by spraying the welding joint before the surface treatment with zinc rich paint, advantages are attained as to corrosion protection, which by far exceeds that which is possible by merely using zinc rich paint or other material. By performing the finishing treatment with zinc rich paint as fast as possible after the metallizing process, while still warm and consequently free from occurring condensation, if any, for instance rain water, and moreover, thanks to the underlying heat from welding, a rapid drying of the zinc rich paint is obtained. In order that the dry zinc film rapidly obtains a galvanic effect, on one hand to the zinc pigments in the metallizing layer and the paint film, and on the other hand to the clean metallic surface, unfavourable weather conditions are merely an advantage at that stage. Thus, the corrosion resistant treatment according to the invention can be performed during bad weather conditions.

If the welding and the surface treatment according to the above described procedure is performed when the joined bodies are exposed to static load from their dead weights, it has been proven that the sector around the surface treated welding joint has shown good durability, and that no cracking or flaking of the zinc coat has occurred. This is also the case when the structure has been exposed to dynamic loads i.e. has been worked under regular service conditions.

We claim:

1. A process for welding a pair of edges and protecting the welding joint formed thereby and adjacent metallic surfaces against rust and corrosion comprising cleaning said edges and said surfaces, applying a first coating layer of a zinc-rich paint containing 90–96 percent zinc in the dry film to a portion of said surfaces while leaving uncoated areas up to a distance of 5–25 centimeters from each of said edges, welding said edges together to form a welding joint, cleaning said welding joint and said uncoated areas, applying a coating layer of rust and corrosion inhibiting hot zinc to said welding joint and adjacent portions of said uncoated areas while leaving uncoated zones between said hot zinc layer and said first layer of zinc-rich paint, immediately applying a second coating layer of said zinc-rich paint over said hot zinc layer and said uncoated zones, said second layer of zinc-rich paint overlapping portions of said first layer of zinc-rich paint.

2. The process of claim 1 further including applying an additional coating layer of a protective material in order to further reinforce the rust and corrosion resistance of said welding joint and said metallic surfaces.

No references cited.

JOHN F. CAMPBELL, *Primary Examiner.*